Sept. 2, 1924.
F. W. ANDREWS
1,506,963
PURIFICATION OF SULPHUR DIOXIDE
Filed Aug. 12, 1919
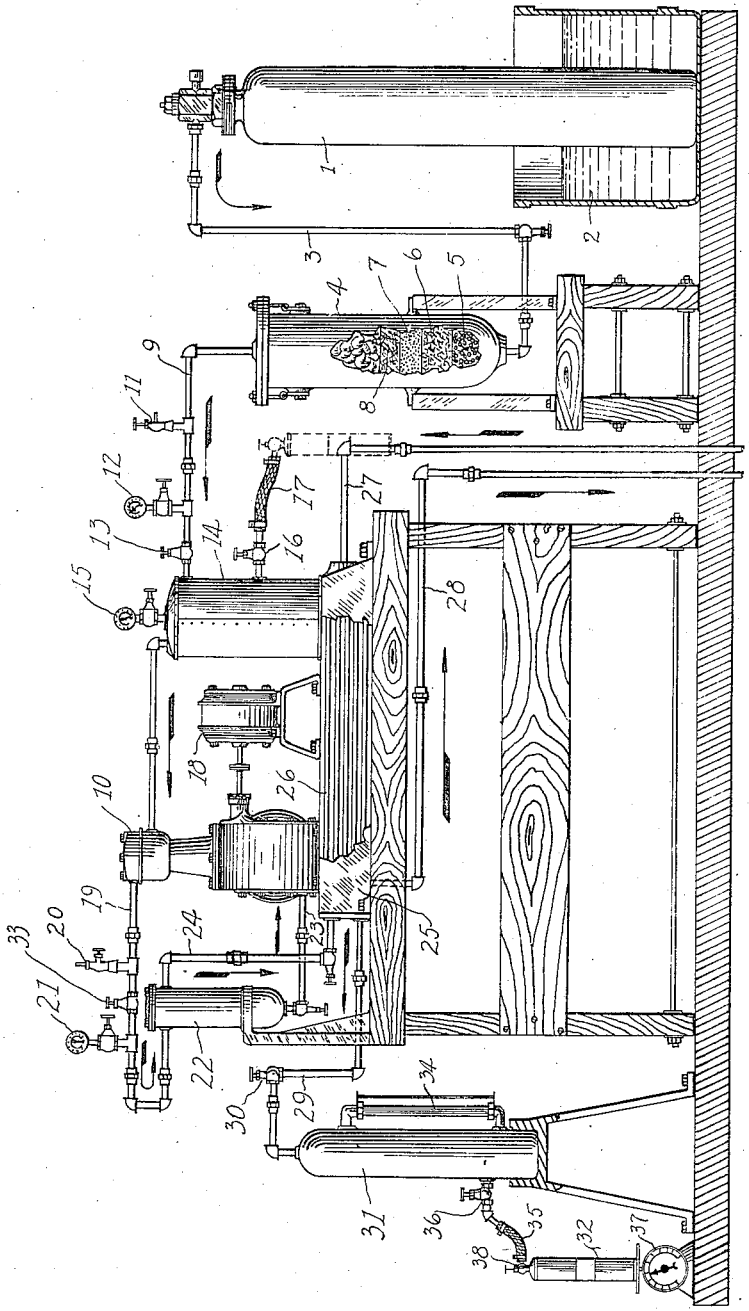
Inventor
Frank W. Andrews
By F. L. Walker
Attorney Patented Sept. 2, 1924.

1,506,963

UNITED STATES PATENT OFFICE.

FRANK W. ANDREWS, OF WAPAKONETA, OHIO.

PURIFICATION OF SULPHUR DIOXIDE.

Application filed August 12, 1919. Serial No. 317,016.

*To all whom it may concern:*

Be it known that I, FRANK W. ANDREWS, citizen of the United States, residing at Wapakoneta, in the county of Auglaize and State of Ohio, have invented certain new and useful Improvements in Purification of Sulphur Dioxide, of which the following is a specification.

This invention relates to an apparatus for and method of treating sulphur dioxide and the like, purifying such chemical agent and charging the containers therewith.

The object of the invention is to simplify the charging as well as the means and mode of operation of purifying vaporous chemicals such as sulphur dioxide and the like, whereby the apparatus will not only be cheapened in construction, but will be more efficient in use, easily manipulated and controlled, economically charged, and unlikely to get out of repair.

A further object of the invention is to provide a new extinguishing agent, and to provide improved means for charging the containers of the purified product, and also improved means for purifying the commercial sulphur dioxide and the like prior to its introduction into the containers.

With the above primary and other incidental objects in view as will more fully appear in the specification, the invention consists of the features of construction, the parts and combinations thereof, and the mode of operation, or their equivalents, as hereinafter described and set forth in the claims.

The drawing herewith is a side elevation, partly broken away of the apparatus for purifying the sulphur dioxide and the like and for introducing it into the ultimate containers.

The material employed as an extinguishing agent is anhydrous liquid sulphur dioxide, highly purified, preferably containing no sulphur trioxide or other foreign substances. This liquid is a commercial product ordinarily supplied by the manufacturers in liquid form in drums containing approximately one hundred and fifty pounds of the product at fifty pounds pressure to the square inch. The liquid has a boiling point of approximately twelve degrees below zero, a niobic color and pungent odor. Being heavier than atmosphere and possessed of such expansive property when discharged in the vicinity of a fire it displaces the oxygen upon which the continuation of the fire is dependent. The product thus possesses great merit as a means of extinguishing fire and being gradually dissipated through the atmosphere it does no incidental damage as is the case when water is used, or when other chemicals in an aqueous solution are employed.

Referring to the drawings, 1 is the drum containing the commercial liquid sulphur dioxide. This drum and its contents are cooled and maintained at a low temperature. The drum has been shown in upright position in a vat or tank of warming solution 2. The solution 2 may be of any suitable character, the one most used being calcium chloride solution of approximately twenty six Baumé specific gravity. This enables the evaporation of the liquid sulphur dioxide at a comparatively low temperature. The top of the drum 1 is connected by a pipe or conduit 3 with a filter chamber 4. The chamber 4 contains a series of filter media through which the gaseous discharge from the drum is passed from the bottom of the chamber upward. The pipe 3 being connected to the bottom of the chamber 4, the gas first encounters a stratum 5 of charcoal, above which is a stratum of coarse pumice stone 6, succeeded by a layer of fine pumice stone 7, over which lies a layer of felt, 8. The successive layers of filter material are preferably separated by partitions of close mesh screen cloth. While the filter materials named are the preferable materials, it is obvious that other products may be substituted therefor without materially affecting the process or final product.

From the top of the filter chamber a pipe or conduit 9 conducts the filtered gas to the compressor 10. The drum 1 being thus connected through the intermediate filter chamber 4 with the intake side of the compressor 10, the contents of the drum is subjected to a much lowered pressure or partial vacuum. The production of such vacuum or lowering of pressure within the drum, together with the increased temperature, due to the submergence of the drum in the warming solution, causes a more rapid evaporation or volatilization of the sulphur dioxide. Under the lowered pressure or in the presence of the vacuum, the volatile portions of the sulphur dioxide will vaporize at a much lower temperature, than is necessary to vaporize any sulphur trioxide, oil of vitrol or other impurities including moisture, which may be contained in the commercial chemical. Thus the vapors of the pure sulphur dioxide are exhausted from the drum 1 and drawn through the filter chambers 4 by the compressor, leaving behind in the drum 1, the less volatile portions of the sulphur dioxide together with sulphur trioxide and oil of vitriol. Any minute particles of such impurities or moisture which may be carried over to the filter chamber will be separated by filtration, leaving the vapors of the sulphur dioxide or the like which may be carried from the filter chamber 4 to the compressor in a highly refined and purified condition. The pipe line 9 is provided with a purge valve 11 through which air may be admitted to the suction line 9 of the compressor if so desired. A gage 12 is also provided in the line 9 for indicating the degree of suction on the filter chamber and through the pipe 9. A globe valve 13 is also provided in the suction line 9 for the purpose hereafter mentioned.

While the suction pipe 9 might lead directly to the compressor 10 for convenience of operation, although not necessary, a vacuum tank 14 is interposed in the pipe line 9, through which the gas is drawn in its passage from the filter chamber to the compressor. This vacuum tank 14 has no function in the treatment of the gas passing therethrough, but is utilized in the preparation of the container to receive its charge. The vacuum tank 14 further serves as an equalizer to maintain a substantially uniform degree of vacuum or exhaustion within the filter chamber 4, and drum 1, in order that the pressure upon the supply quantity of commercial sulphur dioxide may not fluctuate with the movement of the compressor piston. The tank 14 is provided with a vacuum gage 15 with the usual control valve which is used as a check upon the vacuum gage 12, and is further employed to indicate the degree of vacuum within the tank when used in exhausting the containers preparatory to charging same. To this end the tank 14 is further provided with a valved branch line 16 to which is connected a flexible hose 17.

The compressor 10 is of any suitable type. That shown in the drawing is provided with an enclosed crank case and is driven by an electric motor 18. Leading from the discharge side of the compressor 10 is a discharge pipe 19 having therein a purge valve 20, for relieving air from the system, and also a pressure gage 21 by which the degree of compression may be ascertained. The discharge pipe 19 leads to a grease trap 22 in which any entrained oil from the compressor or other heavy foreign materials are precipitated. A small drain pipe 23 conducts the deposited oil from the trap 22 back to the compressor crank case, while the gas passes from the top of the trap through the pipe line 24 to a condenser 25. This condenser is shown in the form of a chamber containing a series of coils 26 through which the compressed gas is circulated and around which water or other cooling medium is circulated. The water is supplied through a supply pipe 27 and discharged through a pipe 28. The purified gas admitted to the condenser under pressure is liquefied therein, and passes thence through a pipe line 29 containing a cut off valve 30 to a receiving vessel 31 in which the refined liquid is stored and from which it is drawn as needed to fill the containers. One of the containers is shown at 32 in process of being filled.

Assuming that a fresh tank 1 has been connected and the apparatus is to be set in operation, the purge valve 20 is opened and the compressor is started, thereby exhausting the air out of the filter chamber 4, vacuum tank 14 and pipe lines 3 and 9, until the gages 12 and 15 show the proper degree of exhaustion, and the gas begins to pass over, the cut-off valve 33 in the discharge line 19 being closed at this time. The air having been purged from the line, the purge valve 20 is closed and the cut-off valve 33 is opened, whereupon the liquefied gas is caused to collect in the receiver 31 after having been passed through the compressor, the grease trap and condenser as before described. The apparatus is continued in operation until the vessel 31 is filled or until sufficient quantity is indicated in the gage glass 34 communicating therewith. The valve 13 is then closed to retain any remaining gas in the drum 1 and filter chamber 4, while either the cut-off valve 33 or 30 or both are closed to retain the liquefied supply of gas under pressure in the vessel 31. The purge valve 20 is then opened and the compressor operated to exhaust the vacuum chamber 14, the intake of which is closed at 13, and the valve 16 being also closed. The container 32 to be filled is then temporarily connected with the flexible hose 17 and the valve 16 is momentarily opened permitting the air contents of the container to be exhausted into the tank 14, producing in the container a partial vacuum. The exhausted container is then connected with the vessel 31 by means of the filling connection 35 and the valve 36 is opened permitting the liquefied gas to discharge into the exhausted container. By first exhausting the container a considerable quantity of the liquid gas may be introduced thereinto. In order to determine when the proper quantity has been discharged into the container it is placed upon a scale 37 and the charge is determined by weight. The container 32 may be of any suitable shape or construction. In the drawing it is shown in the form of a miniature gas drum having at its upper end a discharge nozzle through which the filling is effected, and a cut off valve 38. It is to be understood that the valve 38 is closed after the container is exhausted by being connected with the tank 14, until it is subsequently connected with the supply vessel 31. Assuming that the container is approximately two and a half inches in diameter and eleven inches in height, an ample charge would be one and one-half pounds of the liquified gas, as determined by the scale.

The container is first weighed and assuming that it weighs two and a half pounds, the liquid is admitted from the vessel until a total weight of four pounds is attained. There will then remain an unfilled space of approximately three inches at the top of the container into which the gas expands, thus affording pressure for the discharge of the liquid when the valve 38 is opened. When in use the container is inverted whereby this pressure chamber or space is above the body of liquid, and the discharge is from the bottom thereof. The character of the material is such that the constant expansion of the remaining gas in the container, as the discharge of the contents takes place, maintains an almost constant pressure.

The sulphur dioxide ($SO_2$) employed as extinguishing agent has the further desirable characteristic of being a nonconductor of electricity. In the case of electrical ignition the use of water is extremely dangerous, as the current will sometimes follow the stream or jet with fatal results to the operator. The use of the present agent does not involve this danger. The addition of a quantity of carbon dioxide ($CO_2$) to the principal agent, ($SO_2$) will afford an increased pressure and obviate possibility of the extinguishing agent freezing about the nozzle and obstructing the flow. This mixture is especially valuable for use on airplanes reaching high altitudes.

The principal agent $SO_2$ either alone or with the addition of $CO_2$ has the further desirable characteristic of producing no smoke. The addition of two to eight per cent of carbon tetrachloride to the principal agent, i. e. sulphur dioxide, will produce a heavier gas which will settle more closely and quickly over the area of fire and more quickly displace the oxygen, but is objectionable in that it produces considerable smoke. From the above description it will be apparent that there has thus been provided a new use as an extinguishing agent for a known material, and an apparatus and method of handling and treating the material and charging containers, possessing the particular features of advantage before enumerated as desirable, but which obviously is susceptible of modification in its form, proportion, detail construction, and arrangement of parts and succession of steps, without departing from the principle involved.

Having thus described my invention I claim:

1. The herein described process of treating sulphur dioxide and the like, consisting in subjecting a liquefied body of commercial sulphur dioxide to a partial vacuum and warming the body to induce vaporization of the more volatile portions, leaving in the container unvolatilized moisture, sulphur trioxide, oil of vitriol and other impurities, drawing the vapors through a filter by which any entrained particles of moisture, oil of vitriol, sulphur trioxide and impurities are removed, subjecting the resultant vapors to compression, and condensing the compressed vapors to liquification.

2. The herein described method of treating sulphur dioxide consisting in subjecting a body of commercial sulphur dioxide to a low degree of heat in the presence of a vacuum to induce volatilization of the sulphur dioxide vapors without vaporizing the moisture content, sulphur trioxide or oil of vitriol which may be contained in the commercial product, liquefying the resultant vapors and adding thereto a relatively small quantity of carbon tetrachloride.

In testimony whereof I have hereunto set my hand this 26 day of July A. D. 1919.

FRANK W. ANDREWS.

Witnesses:
W. T. COPELAND,
C. B. HAMILTON.